UNITED STATES PATENT OFFICE 2,484,784

BACTERICIDAL COMPOSITIONS

Arthur Henry Craige, Jr., and Albert L. Kleckner, Indianapolis, Ind., assignors to Allied Laboratories, Inc., Kansas City, Mo., a corporation of Delaware No Drawing. Application July 17, 1945,
Serial No. 605,645

1 Claim. (Cl. 167—65)

This invention relates to pharmaceutical compositions and more particularly relates to pharmaceutical compositions having bactericidal, bacteriostatic, antiseptic, fungicidal and fungistatic properties and containing as the essential ingredients tyrothricin and 2-2'-dihydroxy-5-5'-dichlorodiphenylmethane.

One object of this invention is to provide a preparation suitable for the treatment and prevention of a wide variety of infections of man and animals.

Another object of this invention is to provide a preparation comprising a mixture of tyrothricin and 2-2'-dihydroxy-5-5'-dichlorodiphenylmethane and wherein the mixture has a greater detrimental effect on microorganisms than the sum of the effects of the individual ingredients.

In attaining the objects of the present invention tyrothricin and the 2-2'-dihydroxy-5-5'-dichlorodiphenylmethane are incorporated in a single composition. Suitable compositions may be in the form of dusting powders comprising a mixture of the two essential active ingredients and/or diluted with an inert substance such as talc or starch. Similarly the dusting powders may contain various other substances that are included in dusting powders as for example, boric acid, zinc stearate, zinc peroxide, antiseptic dyes, wetting agents, local anesthetics, etc. Suitable compositions may likewise be those in which the two essential ingredients are incorporated with solid or semi-solid substances; such as soaps, ointments, vanishing creams and similar compositions for topical use. Other suitable compositions include solutions or suspensions of the two essential ingredients in an aqueous medium or an organic liquid medium.

In the above compositions the exact quantity or percentage of the individual essential active ingredients will vary somewhat with the form of the composition and the particular use to which the composition is to be put. In the dusting powder compositions wherein the tyrothricin and the 2-2'-dihydroxy-5-5'-dichlorodiphenylmethane are the sole ingredients, the tyrothricin may be varied from a fraction of a percent to several percent and the 2-2'-dihydroxy-5-5'-dichlorodiphenylmethane from about 1 to 99%. In most compositions we prefer to employ from about 1 to 25% of the 2-2'-dihydroxy-5-5'-dichlorodiphenylmethane and from about 0.0001 to 5% of tyrothricin.

We have found that there is a synergistic action between tyrothricin and the 2-2'-dihydroxy-5-5'-dichlorodiphenylmethane used as the essential ingredients in our compositions. The following tests will serve to illustrate potentiation or bacteriostatic synergism against certain gram-positive cocci in vitro.

*Experimental.*—In preliminary studies it was indicated that the combined bactericidal action of tyrothricin and 2-2'-dihydroxy-5-5'-dichlorodiphenylmethane exceeds that of the individual compounds to such a degree that bactericidal potentiation can be concluded. This conclusion was further tested in the following experiment, employing for test organisms the common pathogens of bovine mastitis, with milk as the vehicle for dilution.

*Procedure.*—To test tubes containing 10 cc. each of sterile milk at 37° C. was added the antiseptic or antiseptics to be tested in quantity sufficient to obtain the concentrations indicated. These tubes were then seeded with either *Streptococcus agalactiae* or *Staphylococcus aureus*, of mastitis origin, by the addition of 0.5 cc. of an 18 hr. broth culture of the organism. Control tubes were prepared by omitting antiseptic. All tubes were held at 37° C. throughout the period of study.

Subcultures were made from each tube at 1, 24, 48 and 72 hours, by transferring a platinum loopful of inoculated milk to a sterile agar slant. These subcultures also were held at 37° C. and were examined for growth at 24 and 48 hours. Visible evidence of bacterial growth in the subculture was taken as indication of failure to kill the organism in the milk specimen by the time of making the transfer. Absence of visible growth in a subculture at 24 hours, but limited growth at 48 hours, was interpreted as evidence of marked inhibition.

*Results — Streptococcus series.* — Tyrothricin, used alone, in concentrations of 10 mgm. per cent killed at 1 hour, all subsequent subcultures appearing negative to growth, whereas concentrations of 5 mgm. per cent or less required 48 hours to kill the streptococcus. 2-2'-dihydroxy-5-5'-dichlorodiphenylmethane, used alone, in concentrations of 1.0 gm. per cent killed at 1 hour, with all subsequent subcultures negative; but 0.5 gm. per cent required 72 hours for complete killing, and 0.1 gm. per cent failed to kill in 72 hours.

In combination; concentrations of tyrothricin, 2 mgm. per cent, and 2-2'-dihydroxy-5-5'-dichlorodiphenylmethane, 0.1 gm. per cent, killed at 1 hour, as did tyrothricin, 0.5 mgm. per cent, and 2 - 2' - dihydroxy-5-5'-dichlorodiphenylmethane, 0.5 gm. per cent, all subsequent subcultures being negative. A combination of tyrothricin, 0.5 mgm.

per cent, and 2-2'-dihydroxy-5-5'-dichlorodiphenylmethane, 0.1 gm. per cent, showed marked inhibition at 1, 24 and 48 hours, and complete killing at 72 hours. Thus, on the basis of minimal concentrations for maximal bactericidal effects, the addition of one-half the effective concentration of 2-2'-dihydroxy-5-5'-dichlorodiphenylmethane increases by 20 times the action of tyrothricin. Conversely, the addition of one-fifth the effective concentration of tyrothricin increases the action of 2-2'-dihydroxy-5-5'-dichlorodiphenylmethane by 10 times.

*Staphylococcus series.*—Tyrothricin, employed alone, completely killed at 80 mgm. per cent, whereas 40 mgm. per cent and lower concentrations failed completely on all subcultures. 2-2'-dihydroxy-5-5'-dichlorodiphenylmethane used alone, killed at 24 hours in a concentration of 1.0 gm. per cent, although this did not kill at 1 hour. concentrations of 2-2'-dihydroxy-5-5'-dichlorodiphenylmethane at 0.5 gm. per cent were effective against staphylococcus at 48 hours, while 0.1 gm. per cent was completely ineffective.

In combination, tyrothricin at 10 mgm. per cent and 2-2'-dihydroxy-5-5'-dichlorodiphenylmethane at 0.1 gm. per cent were bactericidal at 1 hour and on all subsequent subcultures. Naturally, all higher concentrations were completely effective, and since none lower were employed, it seems possible that these levels do not represent the maximum effectiveness of the combination. Nevertheless, it is apparent from these observations that the effectiveness of tyrothricin was increased 8 times by the addition of one-tenth the effective concentration of 2-2'-dihydroxy-5-5'-dichlorodiphenylmethane, and that of 2-2'-dihydroxy-5-5'-dichlorodiphenylmethane was raised 10 times by the addition of one-eighth the effective concentration of tyrothricin.

*Conclusions.*—Multiplying the effective dilutions of the combined antiseptics, based upon their effective concentrations employed alone, we find an increase in effectiveness for the combination: tyrothricin-2-2'-dihydroxy-5-5'-dichlorodiphenylmethane, of 40–50 times against *Streptococcus agalactiae* and 80 times against *Staphylococcus aureus*. Such increases indicate potentiation in bactericidal action.

It is obvious that the preceding decriptions are intended to be illustrative only and that we may vary or modify our compositions to a considerable extent without departing from the spirit of the invention or sacrificing the advantages thereof. We do not, therefore, intend to limit the invention to the specific embodiments herein set forth except as indicated in the claim.

We claim:

A bactericidal composition, having a synergistic effect, containing as the essential active ingredients tyrothricin and 2-2'-dihydroxy-5-5'-dichlorodiphenylmethane.

ARTHUR HENRY CRAIGE, JR.
ALBERT L. KLECKNER.

REFERENCES CITED

The following references are of record in the file of this patent:

UNITED STATES PATENTS

| Number | Name | Date |
|---|---|---|
| 1,707,181 | Weiler et al. | Mar. 6, 1929 |
| 2,250,480 | Gump | July 29, 1941 |

OTHER REFERENCES

Surgery, Gynecology and Obstetrics, Aug. 1944, vol. 79, 205–216, by Traube et al.

Jour. Bacteriology, July 1943, No. 46, pages 83–88, by Stokes et al.